United States Patent [19]

Kearney et al.

[11] 4,190,093
[45] Feb. 26, 1980

[54] VIBRATION WELDING OF EXPANDED BEAD POLYSTYRENE

[75] Inventors: Dolores C. Kearney, Inkster; Bruno Matz, Milford, both of Mich.

[73] Assignee: Ford Motor Company, Dearborn, Mich.

[21] Appl. No.: 957,376

[22] Filed: Nov. 2, 1978

[51] Int. Cl.² .............................. B22C 9/04; B22C 7/02
[52] U.S. Cl. ........................................ 164/34; 164/45; 156/73.5; 164/246
[58] Field of Search ................. 164/34, 35, 36, 45, 164/235, 246, 248, 249; 156/73.5, 73.6; 264/23

[56] References Cited

U.S. PATENT DOCUMENTS

| | | | |
|---|---|---|---|
| 3,002,871 | 10/1961 | Tramm et al. | 156/73.5 |
| 3,275,179 | 9/1960 | Lux et al. | 156/73.5 |
| 4,064,927 | 12/1977 | Ostrowski | 164/249 |

Primary Examiner—Robert D. Baldwin
Assistant Examiner—K. Y. Lin
Attorney, Agent, or Firm—Joseph W. Malleck; Keith L. Zerschling

[57] ABSTRACT

A method of making a composite consumable pattern for use in the cavityless type of metal casting is disclosed. At least two mateable pattern parts are formed entirely of a low density expanded closed-cell polymeric material which is ignitable upon contact with molten metal. The parts are brought together with predetermined mateable surfaces in contact under a pressure of 5-10 psi; one of the parts is vibrated with a frequency of 120-240 cycles per second and an amplitude of 0.03-0.10", to promote a controlled friction at the interface. A predetermined depth of the parts is melted and merged to create a water-tight bond between the mating surfaces upon relief of the vibration.

13 Claims, 1 Drawing Figure

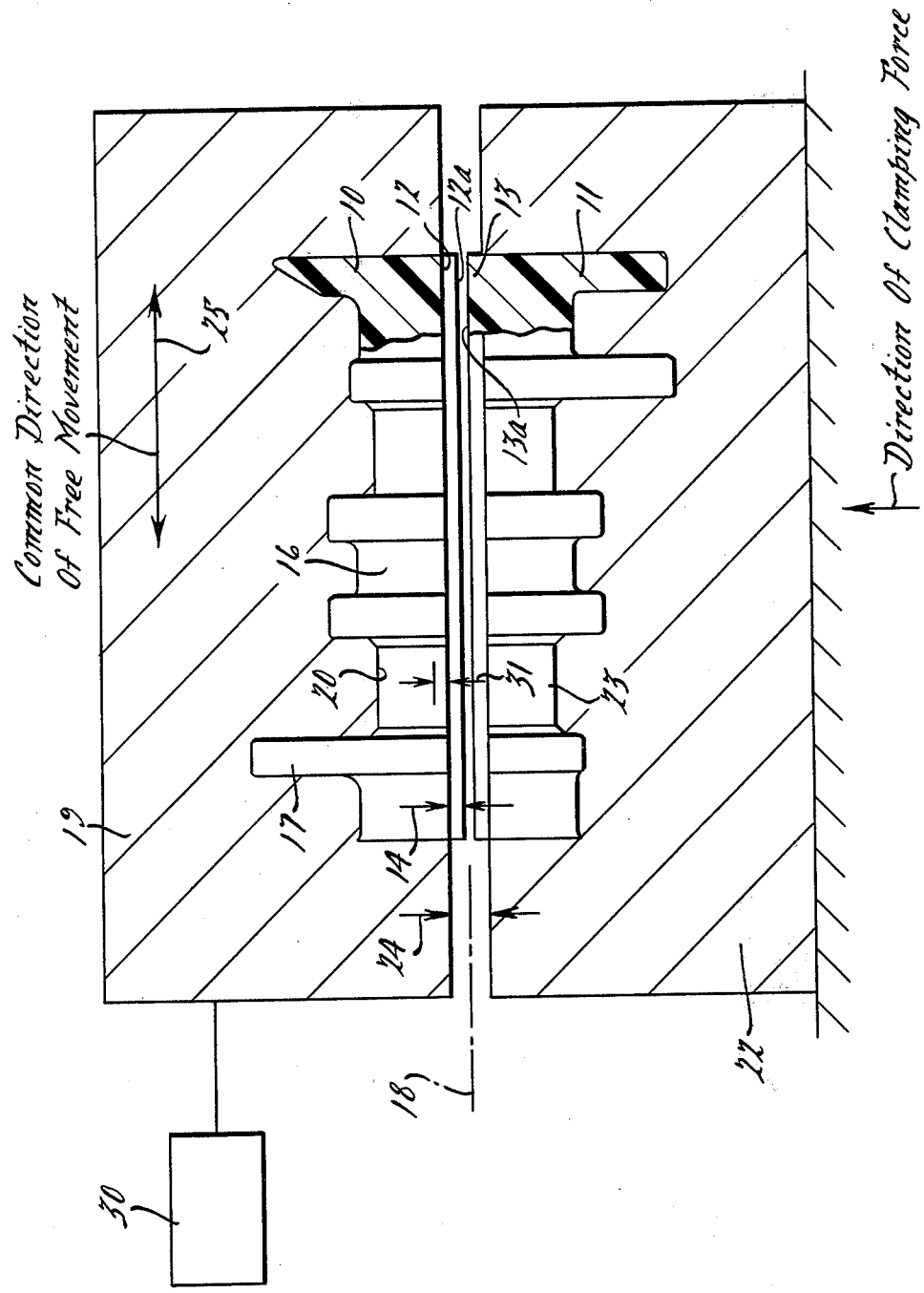

VIBRATION WELDING OF EXPANDED BEAD POLYSTYRENE

BACKGROUND OF THE INVENTION

A technique of casting which employs a plastic pattern consumed by the molten metal during the casting process, appears to offer benefits with respect to a more streamlined foundry technique. The plastic pattern, which has been found to possess the greatest advantages, is that of a low density polystyrene expanded plastic (low density expanded closed-cell polymeric material shall be defined herein as having a density of 3.0 lbs/ft$^3$ or less). This type of plastic is easily distorted by pressure and can be easily changed in shape by manual handling. If such patterns are to be employed in a casting process for making relatively complex parts, the integrity of the outer surface of such expanded plastic must be maintained so as not to result in inexact castings. This problem is compounded when the casting pattern is formed in multiple parts and subsequently joined to form a completed pattern. Several patterns may be integrated into a single cluster or tree to permit the simultaneous pouring of several castings; this will require joining of not only the split patterns but the many patterns and gating elements. Moreover, the singular split pattern may have a parting plane which is stepped and too complex for heat sealing; this type of split pattern is necessitated in castings such as for automotive crankshafts and complex engine housings.

Joining plastic members together has been carried out by many modes including heat sealing. However, heat sealing requires that a significant zone of each member be melted; the control of the zone of heating to a precise surface to be mated is difficult. Moreover, nonuniform heat distribution throughout the plastic may result in distortion in certain regions that is undesirable.

The joining together of plastic parts by a totally mechanical method, utilizing pressure and movement, has been long sought. Such a joining method would be preferable because of the hope that the integrity of the plastic configuration would be maintained before and after the joining sequence. High density plastics have been successfully sealed together by the use of a very high clamping pressure and accompanying relative vibration between the parts. However, to date, low density plastics have not been successfully joined by a mechanical method. Various modes of interlocking low density plastics have been employed, but because of the fragile and distortable nature of such plastics, they have proved to be inadequate. For example, interlocking a tongue and a groove portion of two plastic parts requires application of a distortable pressure on certain locking surfaces which leads to a change in shape of the plastic parts (See U.S. Pat Nos. 3,635,280 and 3,695,340). But more importantly the crevices formed at the interior locking surfaces create a path for chemical washes or refractory to seep inwardly of the pattern and generate defects in the casting when the pattern is consumed, particularly when the washes are a refractory material. If such parts are to be used as a mold, an inexact casting is the result. The exterior configuration of the parts when joined together must remain unchanged between the before and after conditions.

SUMMARY OF THE INVENTION

A primary object of this invention is to improve the consumable pattern method of casting in those applications requiring a composite low-density pattern for producing a highly accurate casting.

Another object of this invention is to successfully join low density pattern parts by a mechanical method using pressure and vibration effecting a quick friction weld.

Yet still another object of this invention is to make a consumable casting pattern of multiple parts which avoids the use of glues or solvents (that add additional gas generation on consumption) and promotes sound defectfree castings.

Features pursuant to the above objects comprise (a) defining split pattern parts each having at least one continuous mating surface with a predetermined amount of melt-down stock attached to it; (b) creating relative agitation of a controlled frequency and amplitude between the mating surfaces pressed together with critically limited pressure for a time no greater than 3 seconds, (c) insuring that the mating surfaces are devoid of contaminants or refractory washes, and (d) deploying said melt-down stock to create a friction weld between which preferably spans the interfacing surfaces to produce a solidified water tight bond which is as strong as the rest of the material and prevents refractory material from seeping thereinto.

SUMMARY OF THE DRAWINGS

FIG. 1 is a schematic illustration of the fixturing and pattern required to carry out the improved method of this invention and indicating the relative forces and movements that take place.

DETAILED DESCRIPTION

This invention is concerned with cavityless (or consumable pattern) casting which is a molding technique involving patterns of expanded polystyrene or the like, shaped to the exact configuration of the casting desired, allowing, of course, for shrinkage of the material being cast. The pattern is used in the preparation of a mold of the cavityless type that is well known to the art. The mold is prepared in accordance with well known molding practices preferably using unbonded molding sand and flask equipment. The consumable pattern is sometimes coated with a permeable refractory wash, particularly for iron castings (but some organic washes have been used). The coated pattern is then embedded in such foundry sand to be eventually replaced by the molten metal. The molten metal vaporizes the expanded plastic pattern and a metal duplicate of the pattern is the result. The cavityless feature is derived from the fact that the pattern is not removed from the mold, but rather is replaced by the molten metal so that the mold is always full of material at any one time. In all other casting processes, a cavity must be provided before the metal can be poured. The unbonded sand, of course, provides an intricate network of passages for the combusted product (gases) of the plastic pattern to migrate out of the zone in which the metal is displacing the plastic.

The production of expanded plastic beads into a molding pattern is also known. Thermo plastic polymeric materials are rendered expandable by the incorporation in the plastic polymer of 1-15% by weight of a suitable expanding agent. These expandable thermo plastic materials are made into beads which in turn are expanded and fused into a cellular structure, particularly useful for low density patterns of this invention. The raw material is a bead which retains a closed cell configuration upon expansion and is to be distinguished from an open cell which results from foaming of liquified plastic. Efforts to produce low density bead material, less than 3 pounds per cubic foot, have involved using high percentages of said blowing agent. Attempts have been made to subject the expanded structure to further expansion in a steam or otherwise heated atmosphere, and this also has decreased the density of the closed cell material, but other less desirable physical characteristics sometimes occur. For example, a change in the cell size in certain regions produces an undesirable structure. The use of a vinyl aromatic polymer impregnated with isopentane and a paraffinic hydrocarbon (having between 16-46 carbon atoms in the carbon chain) provides a bead material capable of producing low densities cellular structures of uniform fine cell size.

The formulated beads are formed into a pattern or molded article by essentially two steps: (1) preexpanding the styrene polymer particles or beads to a density between 1-3 pounds per cubic foot and (2) molding by further heating of the preexpanded particles in a closed mold to cause further expansion and form a fused one piece article having the shape of the mold. The preexpansion step may be carried out by heating the expandable polymer pellets by any suitable heating medium such as steam, hot air, hot water, or radiant heat. The molding step typically comprises as many as four cycles, although some steps may be eliminated: (a) preheat cycle in which the empty mold is preheated with steam, (b) the fill cycle in which the mold is filled with preexpanded polymer particles, (c) a fusion cycle in which the mold is closed and heated with steam to further expand the particles therein and cause the particles to fuse (although this step may be eliminated), and (d) the cool cycle in which the mold is cooled usually with recirculating water or the application of vacuum to cool the polymer below the softening point of the polymer. The mold is opened and the beaded molding is removed from the mold.

The molding of large cross-section parts presents many problems not encountered in the molding of thin sections. The particles expanded in the fusion cycle against the hot mold surfaces; when the surface of the part fuses into a solid surface, it insulates the core or center portion of the part from the heating medium. The resulting molded part has a well fused surface, but decreasingly good fusion at the core of the part. If the pattern were to be cut and rejoined (welded) along these cut surfaces, the surface of the mating planes would be unduly ragged, and yet this is one application that the present invention solves.

Given this soft pliable pre-expanded beaded surface, which may be relatively smooth except for the textured micro crevices between the beads, the problem remains as to how to join predetermined surfaces to form a composite non-distorted cellular pattern useful in making castings. To this end, a preferred embodiment for carrying out the method is illustrated in FIG. 1.

1. At least two mateable pattern parts 10-11 are formed, each having a mating plane or planes each defined by a continuous flat surface (12-13) respectively, all surfaces being oriented to allow freedom of relative movement between the mating surfaces in one common direction. This permits stepped surfaces to be employed provided the freedom in one common direction is maintained. It is necessary to provide a predetermined amount of melt-down stock which will project beyond the desired mating plane presenting surface 12a and 13a respectively. This may take the form of a uniform thickness 14 across the mating surfaces or may be ribbing. The ribbing can be arranged in a variety of patterns, such as separated beads, arcuate segments, or strips. The melt-down stock should have a thickness in the range of 0.03-0.15" measured from the mating surface.

Since the expanded plastic material contains considerable air spaces upon melting, the plastic material will form a very thin hi-density bonding film. The friction affected cells virtually collapse and become a physical liquid film which upon solidification forms a non-porous water-tight bonding film. In this manner, sufficient melt-down stock becomes available for formimg said film.

The parts are constituted entirely of an expanded low density closed cell plastic material, except at the bonded film, which upon contact with molten metal is ignited and consumed. Low density herein is defined to be 3.0 lbs/ft$^3$ or less.

The pattern parts 10-11 in FIG. 1 are designed to provide a replica of a crankshaft useful for automotive applications, the plastic having a density of 1.25-1.5 lbs/ft$^3$. The crankshaft has a series of critical annular bearing surfaces conforming to surfaces 16 and crankarms conforming to surfaces 17 offset from the centerline 18 of the crankshaft. The pattern parts 10-11 must be maintained devoid of a refractory wash or refractory chemical coating prior to being joined together as a composite pattern. If wash coatings were to be applied, they would contaminate the mateable surfaces 12-13, interfering not only with the friction weld but also with the casting process. If a water-tight bond is not effected at the mating surfaces, subsequent entrance of refractory materials into the unbonded crevice can take place. This promotes a fracture plane or defect in the final metal casting.

2. The mateable pattern parts 10-11 are placed into the fixtures as shown in FIG. 1, each fixture may be formed of epoxy or urethane plastics for economy or may be cast of a light metal. One pattern part 10 is cradled by a fixture 19 which is maintained stationary. Fixture 19 has an interior cavity 20 complimentary to the exterior shape of the pattern part 10 so that it is received in a snug nesting condition. The other pattern part 11 is similarly received by a fixture 22 which has an interior cavity 23 adapted to receive the exterior configuration of pattern part 11; fixture 22 is mounted for reciprocal or vibratory movement in a direction transverse to the distance 24 separating the pattern parts and more particularly in a plane 25 which is parallel to the flat surfaces 12-13 to be joined. It is preferable that the mateable surfaces 12-13 be held in a position so that they are juxtaposed and substantially horizontal facilitating arrangement of the fixtures. To this end, a sequence of assembly may be employed which consists of (a) mounting fixture 22 with its cavity 23 facing upwardly, (b) drop pattern part 11 into cavity 23 with its projecting surface 13a facing upwardly, (c) rest pattern part 10 on top of part 11 with surface 12a resting on surface 13a, (d) place fixture 22 over part 10 in a nested condition and proceed to step 3 below.

3. The pattern parts are brought together into contact, with surfaces 12a and 13a of the melt-down stock in engagement. The mateable surfaces 12 and 13 are parallel and opposed. The melt-down stock and/or mateable surfaces 12-13 are urged together with a critically low force of 5-10 psi. Such force may typically be applied by a hydraulic piston and cylinder urging a platen against said fixtures. The actual force applied at the surface of the plastic parts is a function of the cylinder size, but such actual force must be in the critical range of 5-10 psi.

4. While in said forced contacted relation, the upper fixture is moved in a vibratory motion in said common direction 25 by an apparatus 30. The movement must have a controlled stroke or amplitude of 0.03-0.10" and a relative movement or frequency of 120-240 cycles/seconds. The region about surfaces 12-13, including the melt-down stock, is the only material projecting from the fixtures. The size or irregular shape of the part is not a limitation, however, the mating surfaces to be joined must be free to move in one common direction, all mateable surfaces allowing vibratory movement in this common direction. The pattern pieces may be hollow or solid, and even interrupted, provided they present the predetermined mating surfaces.

Apparatus 30, to move the fixture 22 in the proper frequency and amplitude, may essentially consist of one moving element with no bearing surfaces to wear or require lubrication, such as disclosed in U.S. Pat. No. 3,920,504. Reciprocating motion is achieved by magnetic force alternating at 120-250 cycles/sec. However, ultrasonic mechanisms may also be employed where a sonic welding machine may be modified to produce the low joint pressure needed for this material. This vibratory force must only work on the fixture 22, causing the machanical suspension thereof to vibrate while the other fixture 19 is held rigid. The application of vibratory motion is carried out for a period of time no greater than 2 seconds (preferably 1 or less second) which is sufficient to generate frictional heat to melt the stock 15. The expanded polystyrene plastic material of the melt-down stock will liquify and the cells will collapse to solidify when the vibration is stopped. If ribbing or a projection is not employed, then a depth (31) of the material adjacent to mateable surfaces 12-13, to a distance of 0.03-0.15" must be expected to be displayed as the melt-down stock.

If a higher clamping force than that prescribed is employed, considerable distortion of the mating surfaces results to provide an imprecise pattern configuration. The amount of friction which is generated must be highly accurately determined because of the expanded beaded nature of the pattern part. Finer surface grains will facilitate a more precise weld. If pressures lower than that prescribed are employed, there will be insufficient friction developed as a result of the vibratory motion so that an inadequate bond will result. If a magnetic alternating force, outside of the prescribed frequency is used, it has been found that tearing of the surface beads takes place at the low frequency range and inadequate friction is developed; at excessing frequencies, insufficient friction is obtained because the stroke or amplitude must be limited to accommodate such frequency. Amplitudes in excess of 0.15" has been tried and it has been found that vibrations are transferred to other parts of the machine, such as the stationary fixture and it becomes difficult to isolate relative movement to the upper fixture.

The method disclosed herein is particularly unique because of the discovery of critical parameters that must be observed to friction weld expanded closed-cell plastics having a density of 3 lbs/ft³ or less: (a) joining pressure of 5-10 psi, (b) melt-down stock having a thickness of 0.03-0.15 inches, (c) vibration amplitude of 0.10 inch or less, (d) vibration cycle time of 2 seconds or less. There will be virtually no flash produced at the edges of the weld, avoiding the necessity for special traps, because the expanded beaded plastic collapses to such a low volume film devoid of flash.

I claim:

1. A method of making a composite consumable pattern for use in the cavityless type of metal casting, comprising:
   (a) forming at least two mateable pattern parts, each having at least one mating plane defined by a flat surface except for predetermined melt-down projections on said surfaces, said parts being constituted entirely of a low density expanded closed-cell polymeric material having a density of 3 lbs./ft³ or less which upon contact with molten metal is ignited and consumed,
   (b) bringing said parts together into contact with said mating surfaces parallel and juxtaposed, while urging said contact with a force of 5-10 psi,
   (c) while in said forced contacting relationship, relatively vibrating said parts to promote friction at at least one of the melt-down projections and surfaces thereby promoting a friction weld upon resolidification of the melt-down material, said relative vibration being carried out for a period of time no greater than 2 seconds, with a vibration amplitude of 0.03-0.10" and a frequency of 120-240 cycles/second.

2. The method as in claim 1, in which said melt-down projections comprise a continuous zone of the part overlaying the mating surface having a thickness of 0.03-0.15", said melt-down projection constituting the sole contact between said parts during vibration welding, and said melt-down projections becoming a meltable quantity of material which upon cessation of the relative vibratory motion forms a solidified water-tight bond between mating surfaces.

3. The method as in claim 1, in which the melt-down projections are ribs which after subjection to vibratory friction do melt and form a liquid body of material which spreads across the intercontacting mating surfaces.

4. The method as in claim 1, in which said pattern parts are split halves of a configuration designed to form a crankshaft having a plurality of lobes and crankarms offset from a central crank axis, said mating plane being stepped.

5. The method as in claim 1, in which said pattern parts are each devoid of any refractory coating thereon prior to the joining process.

6. The method as in claim 1, in which said pattern parts are each formed entirely of expanded polystyrene.

7. The method as in claim 1, in which said parts are brought together for relative vibratory motion by use of two fixtures, one fixture being held stationary while the other is subjected to a magnetic force alternating at said predetermined frequency, said force moving the movable fixture in a direction parallel to the flat surfaces of said pattern parts.

8. The method as in claim 1, in which the urging force is preferably 7 psi at the interengaging surfaces of said mateable parts.

9. A method of joining entirely of a low density expanded closed-cell polymeric plastic elements having a density of 3 lbs./ft³ or less, comprising:
  (a) forming each said element with a joining surface having a predetermined melt-down thickness, said surfaces being arranged to permit relative movement between the parts when mated for joining in one common direction
  (b) while urging said joining surfaces together with a force of 5–10 psi measured at said surfaces, reciprocally moving said parts in said direction of freedom relative to each other with a frequency of 120–240 cycles/sec., an amplitude of 0.03–0.10", a cycle time of 2 seconds or less, to produce melting of said predetermined thickness as a result of friction without distortion of the configuration of the elements.

10. The method as in claim 9, in which the melt-down thickness is limited to 0.03–0.15" so that no flash is produced at the welded joint.

11. The method as in claim 9, in which said joining surfaces is limited to a projection at least along the periphery of the joining surfaces, so that upon friction melting of said projection, a water-tight bond is created at least at said edges to prevent the entrance of particles into the interior of said joined parts.

12. A method of making metal castings, comprising:
  (a) form pattern parts to be joined entirely of expanded closed-cell polymeric thermoplastic material having a density of 3 lbs/ft³ or less, said parts each being shaped to have one or more joining surfaces effective to mate with complimentary joining surfaces on the other part, said joining surfaces being free to move relative to each other in one common direction when interengaged,
  (b) while urging said parts together with a force of 5–10 psi measured at the interengaging surfaces reciprocally moving said parts in said direction of freedom relative to each other with a frequency of 120–240 cycles/sec., an amplitude of 0.03–0.10", a cycle time of 2 seconds or less, vibrating at least one of said parts to generate friction to melt a predetermined portion of the part adjacent said interengaging surfaces, which melted stock effects a water-tight bonding film between the parts upon solidification and forms a unitary pattern,
  (c) coating said unitary pattern with a refractory material, said bonded joint preventing the entrance of any of said refractory material into said joint,
  (d) inserting said unitary pattern in a casting flask and surrounding said pattern with unbonded dry sand which is vibrated to effect a locked and compacted molding medium about the pattern, and
  (e) introducing molten metal to said pattern to consume and displace the same for thereby providing a metal replica casting of the pattern; said casting being free of internal defects and being totally sound at the zone where said pattern joint previously existed.

13. The method as in claim 12, in which the plurality of pattern parts include gating elements and parts to form more than one casting within the same welded pattern, said casting parts being clustered about a common sprue and gating system.

* * * * *